US012640170B2

(12) United States Patent
Zaima

(10) Patent No.: US 12,640,170 B2
(45) Date of Patent: May 26, 2026

(54) MAGNETIC DISK DEVICE WITH DESICCANT UNITS MOUNTED TO INNER AND OUTER COVERS

(71) Applicants:Kabushiki Kaisha Toshiba, Tokyo (JP); Toshiba Electronic Devices & Storage Corporation, Tokyo (JP)

(72) Inventor: Shino Zaima, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/920,271

(22) Filed: Oct. 18, 2024

(65) Prior Publication Data

US 2026/0018191 A1     Jan. 15, 2026

(30) Foreign Application Priority Data

Jul. 10, 2024     (JP) ................................. 2024-111235

(51) Int. Cl.
G11B 33/14          (2006.01)
G11B 25/04          (2006.01)
G11B 33/02          (2006.01)
(52) U.S. Cl.
CPC ........ G11B 33/1453 (2013.01); G11B 25/043 (2013.01); G11B 33/027 (2013.01); G11B 33/1466 (2013.01)

(58) Field of Classification Search
None
See application file for complete search history.

(56) References Cited

U.S. PATENT DOCUMENTS

| | | | |
|---|---|---|---|
| 5,734,521 A | 3/1998 | Fukudome et al. | |
| 6,356,407 B1 | 3/2002 | Slezak | |
| 7,630,169 B2 | 12/2009 | Murakami | |
| 8,254,055 B2 | 8/2012 | Brown | |
| 8,693,135 B2 | 4/2014 | Brown | |
| 11,587,596 B2 | 2/2023 | Chan et al. | |
| 2011/0149435 A1 | 6/2011 | Brown | |
| 2014/0377143 A1 | 12/2014 | Ellison et al. | |
| 2019/0282945 A1 | 9/2019 | Lu et al. | |
| 2020/0066308 A1 | 2/2020 | Kraus et al. | |
| 2022/0375502 A1 | 11/2022 | Mizutani et al. | |
| 2025/0104741 A1* | 3/2025 | Zaima et al. ...... | G11B 33/1453 |

* cited by examiner

*Primary Examiner* — Craig A. Renner
(74) *Attorney, Agent, or Firm* — Kim & Stewart LLP

(57) ABSTRACT

A magnetic disk device according to an embodiment includes a housing in which a base, an inner cover provided with a first through-hole, and an outer cover are combined in this order and hermetically sealed, a magnetic disk that is stored in the housing, a first desiccant unit that is provided at the inner cover to face the base at a position away from the base, and a second desiccant unit that is provided at the outer cover and inserted into an internal space of the housing through the first through-hole provided in the inner cover to face the base at a position away from the base.

10 Claims, 7 Drawing Sheets

MAGNETIC DISK DEVICE WITH DESICCANT UNITS MOUNTED TO INNER AND OUTER COVERS

CROSS-REFERENCE TO RELATED APPLICATIONS

This application is based upon and claims the benefit of priority from Japanese Patent Application No. 2024-111235, filed on Jul. 10, 2024; the entire contents of which are incorporated herein by reference.

FIELD

Embodiments described herein relate generally to a magnetic disk device.

BACKGROUND

Magnetic disk devices have housings that store various components including magnetic disks. The housings include, for example, a housing in which a base, an inner cover, and an outer cover are combined in this order. In order to reduce the rotational resistance of the magnetic disks, the inside of the housing is filled with a He gas or the like.

In a magnetic disk device configured as described above, a desiccant may be sealed for humidity control for the housing. In order to maintain the hygroscopicity of the desiccant, it is preferable to extremely reduce an air exposure time of the desiccant when sealing the desiccant in the housing.

BRIEF DESCRIPTION OF THE DRAWINGS

FIGS. 2A and 2B are schematic diagrams each illustrating an exemplary configuration of a desiccant assembly according to an embodiment;

DETAILED DESCRIPTION

A magnetic disk device according to an embodiment includes a housing in which a base, an inner cover provided with a first through-hole, and an outer cover are combined in this order and hermetically sealed, a magnetic disk that is stored in the housing, a first desiccant unit that is provided at the inner cover to face the base at a position away from the base, and a second desiccant unit that is provided at the outer cover and inserted into an internal space of the housing through the first through-hole provided in the inner cover to face the base at a position away from the base.

Embodiments of the present invention will be described in detail below with reference to the drawings. Note that the present invention is not limited to the following embodiments. Furthermore, component elements in the following embodiments include component elements that are readily conceivable by a person skilled in the art or that are substantially equivalent.

EMBODIMENTS

Hereinafter, the embodiments will be described in detail with reference to the drawings.

(Exemplary Configuration of Magnetic Disk Device)

Figure 1:
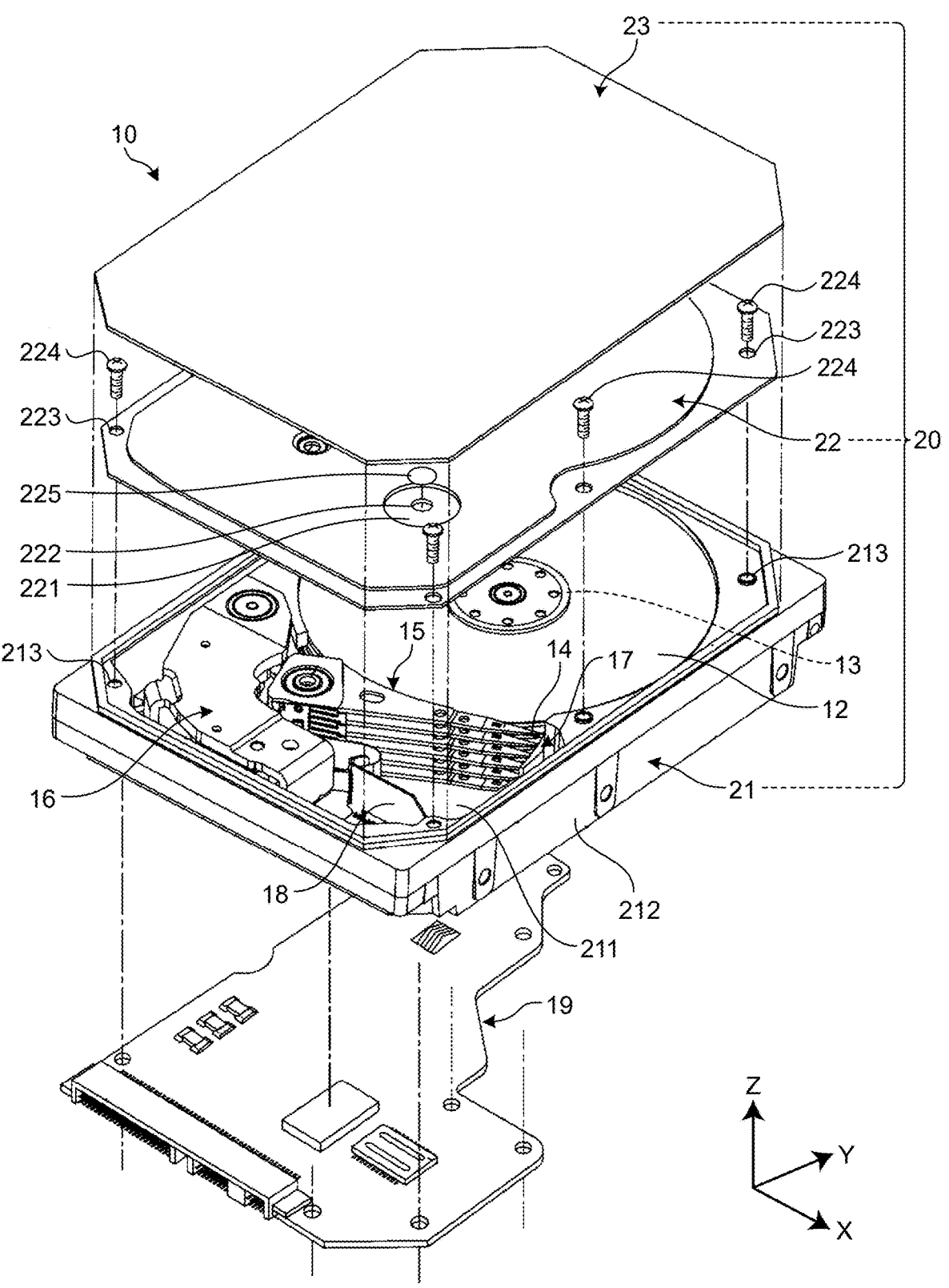
FIG. 1 is an exemplary exploded perspective view of a magnetic disk device according to an embodiment.

FIG. 1 is an exemplary exploded perspective view of a magnetic disk device 10 according to an embodiment. The magnetic disk device 10 of the embodiment is configured as, for example, a hard disk drive (HDD). However, the magnetic disk device 10 of the embodiment may be another magnetic disk device such as a hybrid HDD.

Note that in the present specification, an X-direction, a Y-direction, and a Z-direction are defined for convenience. The X-direction, the Y-direction, and the Z-direction are orthogonal to each other. The X-direction is defined as a direction extending along the width of the magnetic disk device 10. The Y-direction is defined as a direction extending along the depth of the magnetic disk device 10. The Z-direction is defined as a direction extending along the thickness of the magnetic disk device 10, and may also be referred to as a vertical direction in the present specification.

As illustrated in FIG. 1, the magnetic disk device 10 includes a plurality of magnetic disks 12, a spindle motor 13, a plurality of magnetic heads 14, a head stack assembly (HSA) 15, a voice coil motor (VCM) 16, a ramp load mechanism 17, a flexible printed circuit board (FPC) 18, a printed circuit board (PCB) 19, and a housing 20 that covers these members. Each of the magnetic heads 14 is also referred to as a slider.

The housing 20 includes a base 21, an inner cover 22, and an outer cover 23. The base 21, the inner cover 22, and the outer cover 23 are made of a metal such as an aluminum alloy or stainless steel. However, the base 21, the inner cover 22, and the outer cover 23 may be made of another material.

The base 21 is a bottomed container and includes a bottom wall 211 and a side wall 212. The bottom wall 211 is formed into substantially a rectangular plate shape extending along an XY plane. The side wall 212 protrudes from the edges of the bottom wall 211 in the Z-direction. The side wall 212 has an upper surface provided with a plurality of screw holes 213.

The inner cover 22 is formed into substantially a rectangular plate shape extending along an XY plane. The inner cover 22 includes a plurality of insertion holes 223 at positions corresponding to the screw holes 213 of the side wall 212 of the base 21.

In addition, the inner cover 22 includes a plurality of recessed portions 221 slightly recessed from an upper surface of the inner cover 22. Each of these recessed portions 221 is provided in the inner cover 22 inward from a portion vertically overlapping the side wall 212 of the base 21, and the recessed portion 221 has a center portion provided with a breather hole 222 or an insertion hole 223 that penetrates the inner cover 22 in a plate thickness direction. Some of the members stored in the base 21 are provided with screw holes which are not illustrated. The insertion hole 223 provided at the center of the recessed portion 221 is arranged at a position corresponding to each of the screw holes provided in some of the members. A seal 225 is applied to each of the breather hole 222 as well as the insertion holes 223 through which screws are fastened, and closes each of the breather hole 222 and the insertion holes 223.

Note that FIG. 1 illustrates only a breather hole 222, of the breather holes 222 or the insertion holes 223 provided at the centers of these recessed portions 221.

A plurality of screws 224 is inserted into the plurality of insertion holes 223 of the inner cover 22 and fixed in the plurality of screw holes 213 of the base 21, and therefore, the inner cover 22 is mounted to an end of the side wall 212 of the base 21 so as to overlap the base 21 in the Z-direction, and is fixed to the members stored in the base 21. A gasket which is not illustrated is interposed between the inner cover 22 and the base 21.

The outer cover 23 is hermetically joined, for example, by welding, to the end of the side wall 212 of the base 21 to cover the inner cover 22.

With such a configuration, the inside of the housing 20 is sealed. The housing 20 internally stores the magnetic disks 12, the spindle motor 13, the magnetic heads 14, the HSA 15, the VCM 16, the ramp load mechanism 17, and the FPC 18 which are described above. Furthermore, the housing 20 has an internal space that is filled with a gas, such as a He gas, having a density lower than that of air.

Each of the magnetic disks 12 is, for example, a disk-shaped recording medium having a recording surface provided with a magnetic recording layer on an upper surface, a lower surface, or the like. In the example of FIG. 1, the magnetic disk 12 has a diameter of, for example, 3.5 inches. However, the magnetic disk 12 is not limited to this example.

The spindle motor 13 supports and rotates the plurality of magnetic disks 12 overlapped at predetermined intervals in the Z-direction in which the recording surfaces thereof face each other. Here, the internal space of the housing 20 is filled with, for example, the He gas or the like as described above. This configuration prevents the magnetic disk 12 rotating at a high speed from having air resistance, reducing the rotational resistance of the magnetic disk 12.

The magnetic disk device 10 of the embodiment configured as described above is also referred to as a He-filled HDD, a He-sealed HDD, or the like. Filling the housing 20 with the He gas or the like to reduce the rotational resistance of the magnetic disk 12 makes it possible to form the magnetic disk 12 having a further reduced thickness, increasing the number of magnetic disks 12 stacked to increase the capacity of the magnetic disk device 10.

The plurality of magnetic disks 12 is held on a hub of the spindle motor 13, for example, by a clamp spring. In the example of FIG. 1, the magnetic disk device 10 includes 10 magnetic disks 12 arranged in the Z-direction. Note that the number of the magnetic disks 12 is not limited to this example.

Each of the magnetic heads 14 records and reproduces information, on and from the recording surface of each magnetic disk 12. In other words, the magnetic head 14 reads and writes information from and to the magnetic disk 12. The magnetic heads 14 are mounted on the HSA 15.

The HSA 15 is rotatably mounted to the base 21 at a position spaced apart from the magnetic disks 12 in a direction substantially orthogonal to the Z-direction. The VCM 16 rotates the HSA 15 to position the magnetic heads 14 to a desired position. The ramp load mechanism 17 holds the magnetic heads 14 moved to the outermost periphery of the magnetic disks 12, at an unload position spaced apart from the magnetic disks 12.

The FPC 18 is supported and reinforced by an FPC plate provided at the bottom wall 211 of the base 21. The FPC 18 has one end that is connected to flexures included in the HSA 15. The FPC 18 is electrically connected to the magnetic heads 14 via the flexure of the HSA 15. The other end of the FPC 18 is connected to a connector provided at the bottom wall 211 of the base 21.

The PCB 19 is mounted to the outside of the housing 20, such as a back side of the bottom wall 211 of the base 21. Various electronic components, such as a relay connector connected to the connector at the bottom wall 211 of the base 21, an interface (I/F) connector connected to a host computer, and a controller controlling the operation of the magnetic disk device 10, are mounted on the PCB 19. The relay connector is electrically connected to the FPC 18 via the connector at the bottom wall 211 of the base 21.

Note that, in the He-filled HDD or the like such as the magnetic disk device 10 according to the embodiment, a gas other than the filled gas such as the He gas, moisture, and the like become a contamination source in the housing 20, and thus, it is important to control humidity inside the housing 20. Therefore, in the magnetic disk device 10 of the embodiment, a desiccant assembly that is filled with a desiccant is enclosed in the housing 20.

(Exemplary Configuration of Desiccant Assembly)

Next, an exemplary configuration of a desiccant assembly 100 enclosed in the magnetic disk device 10 of the embodiment will be described with reference to FIGS. 2A and 2B.

Figures 2A, 2B:
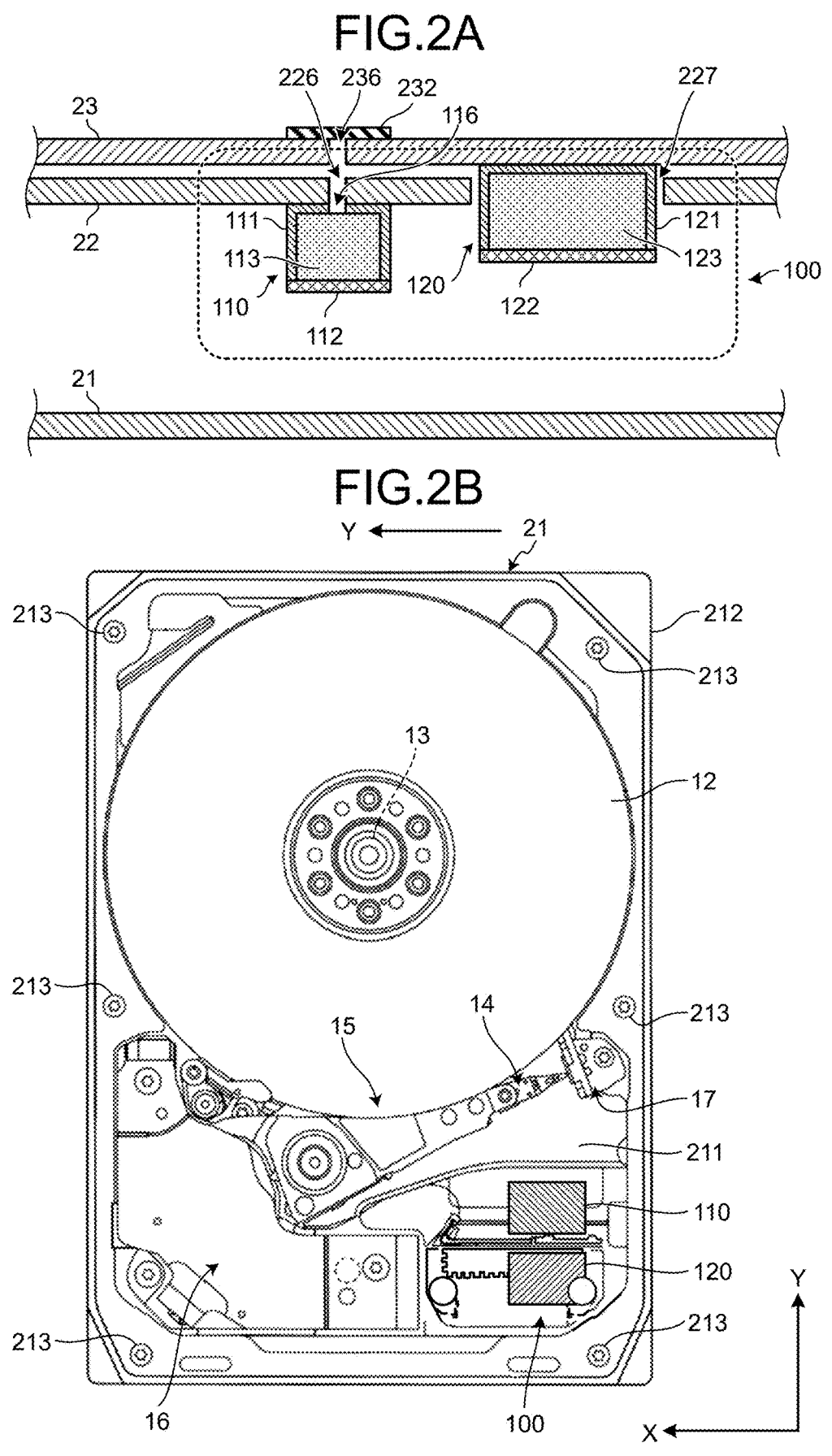

FIGS. 2A and 2B are schematic diagrams each illustrating an exemplary configuration of the desiccant assembly 100 according to an embodiment. More specifically, FIG. 2A is a cross-sectional view along the Y-direction of the desiccant assembly 100 enclosed in the magnetic disk device 10. FIG. 2B is a top view illustrating an internal structure of the magnetic disk device 10 with the desiccant assembly 100 enclosed.

As illustrated in FIGS. 2A and 2B, the desiccant assembly 100 of the embodiment is provided to be accommodated in an empty space in the housing 20 such as a region surrounded by the HSA 15, the VCM 16, and the FPC 18.

The desiccant assembly 100 includes a plurality of desiccant units 110 and 120. In the examples of FIGS. 2A and 2B, these desiccant units 110 and 120 are arranged in the region surrounded by the HSA 15, the VCM 16, and the FPC 18, side by side in the Y-direction. The desiccant unit 120 is positioned on a side closer to a short side of the inner cover 22 in the Y-direction, and the desiccant unit 110 is arranged at a position closer to a side on which the magnetic disks 12 and the like are stored, in back of the inner cover 22 in the Y-direction.

However, the arrangement of these desiccant units 110 and 120 is not limited to the examples of FIGS. 2A and 2B. The desiccant units 110 and 120 may be reversed in position in the Y-direction, and the desiccant units 110 and 120 may be arranged side by side in a direction other than the Y-direction, such as the X-direction.

The desiccant units 110 and 120 of the embodiment are examples of a first and second desiccant units, respectively.

The inner cover 22 is provided with a plurality of through-holes 226 and 227 so as to mount these desiccant units 110 and 120, and the outer cover 23 is provided with a through-hole 236 at a position where the through-hole 236 is vertically aligned with the through-hole 226 in the inner cover 22. As in the breather holes 222 and the insertion holes 223 of the inner cover 22 (see FIG. 1), a seal 232 made of, for example, aluminum is also applied to the through-hole 236 provided in the outer cover 23, and airtightness in the housing 20 is maintained.

The through-holes 226 and 227 provided in the inner cover 22 of the embodiment are examples of a second through-hole and the first through-hole, respectively. Furthermore, the through-hole 236 provided in the outer cover 23 is an example of a third through-hole.

Note that the through-hole 226 in the inner cover 22 may be provided separately from the breather hole 222 described above, or the through-hole 226 and the breather hole 222 may be the same. In this configuration, the through-hole 226 can also serve as the breather hole 222.

The desiccant unit 110 is mounted to a position on an inner surface of the inner cover 22 facing the bottom wall 211 of the base 21 of the housing 20, where the through-hole 226 is provided. The desiccant unit 110 includes a case 111, a filter 112, and a desiccant 113.

The case 111 is made of resin and includes an internal space that is configured to be filled with the desiccant 113, and has an upper surface provided with a through-hole 116. The cross-section of the case 111 taken in a direction along a plane of the inner cover 22 can have, for example, a circular shape.

The upper surface of the case 111 is attached to the inner cover 22 so that through-hole 116 formed in the upper surface is vertically aligned with the through-hole 226 in inner cover 22. The lower surface of the case 111 is provided with the filter 112.

However, the case 111 may be made of metal. In this configuration, the case 111 may be made of the same metal as the inner cover 22, such as an aluminum alloy or stainless steel, or the case 111 and the inner cover 22 may be integrally formed. Furthermore, the shape of the case 111 is not limited to the circular shape, and the case 111 may have a polygonal cross-sectional shape such as a rectangular shape.

Here, the through-hole 226 in the inner cover 22 has an opening area that is formed at least smaller than a cross-sectional area of the desiccant unit 110 taken in the direction along the plane of the inner cover 22. If the atmosphere in the housing 20 can be replaced as described later, the through-hole 226 in the inner cover 22 preferably has an opening area as small as possible.

In addition, the through-hole 236 provided in the outer cover 23 can also be configured to have an opening area smaller than the cross-sectional area of the desiccant unit 110 taken in the direction along the plane of the inner cover 22 and further can have an opening area substantially equal to that of, for example, the through-hole 226 in the inner cover 22.

The filter 112 is, for example, a membrane filter made of poly-tetra-fluoro-ethylene (PTFE), and is capable of passing air, a gas such as He, moisture in the gas, and the like.

The desiccant 113 is an adsorbent capable of adsorbing moisture or the like in the gas, and is filled in the internal space of the case 111. The desiccant 113 is exposed to the atmosphere in the housing 20 via the filter 112 described above. When the filter 112 is interposed in this manner, dust or the like that may be generated from the desiccant 113 can be removed by the filter 112, suppressing contamination in the housing 20.

The desiccant unit 120 is attached on an inner surface of the outer cover 23 facing a surface on a side opposite from the inner surface of the inner cover 22, and is inserted into the internal space of the housing 20 surrounded by the inner cover 22 and the base 21 through the through-hole 227 provided in the inner cover 22. The desiccant unit 120 includes a case 121, a filter 122, and a desiccant 123.

The case 121 is made of resin and includes an internal space that is configured to be filled with the desiccant 123. The cross-section of the case 121 taken in a direction along a plane of the outer cover 23 can have, for example, a circular shape. The case 121 has an upper surface that is attached to the outer cover 23. The case 121 has a lower surface that is provided with the filter 122.

However, the case 121 may be made of metal. In this configuration, the case 121 may be made of the same metal as the outer cover 23, such as aluminum alloy or stainless steel, or the case 121 and the outer cover 23 may be integrally formed. Furthermore, the shape of the case 121 is not limited to the circular shape, and the case 121 may have a polygonal cross-sectional shape such as a rectangular shape.

Similarly to the filter 112 described above, the filter 122 is, for example, a membrane filter made of PTFE, and is capable of passing air, a gas such as He, moisture in the gas, and the like.

The desiccant 123 is an adsorbent capable of adsorbing moisture and the like in the gas, and is filled in the internal space of the case 121. The desiccant 123 is exposed to the atmosphere in the housing 20 via the filter 122 described above. When the filter 122 is interposed in this manner, dust or the like that may be generated from the desiccant 123 can be removed by the filter 122, suppressing contamination in the housing 20.

Here, the adsorbent made to adsorb moisture and the like in the gas includes a reversible adsorbent and an irreversible adsorbent. Even when the hygroscopicity of the reversible adsorbent is reduced due to adsorption of moisture, it is possible to restore the hygroscopicity by performing vacuum drying or the like thereafter. The irreversible adsorbent cannot restore the hygroscopicity having been reduced once by vacuum drying or the like, and it is also difficult to reproduce the hygroscopicity at a temperature of equal to or less than 80° C. which is an upper limit value in heat resistance of the magnetic disk device 10. Meanwhile, the irreversible adsorbent is capable of maintaining hygroscopicity even in a low-humidity environment with a humidity of 10% or less in which the reversible adsorbent does not function.

The desiccants 113 and 123 described above can be any combination of the reversible adsorbent and the irreversible adsorbent. In other words, both the desiccants 113 and 123 can be the irreversible adsorbent, or either one of the desiccants 113 and 123 can be the reversible adsorbent and the other thereof can be the irreversible adsorbent.

In the magnetic disk device 10 of the embodiment, in an example, the desiccant 113 of the desiccant unit 110 attached to the inner cover 22 is preferably the reversible adsorbent, and the desiccant 123 of the desiccant unit 120 attached to the outer cover 23 is preferably the irreversible adsorbent. More specifically, for the desiccant 113, for example, silica gel or the like can be used as the reversible adsorbent. Furthermore, for the desiccant 123, for example, synthetic zeolite such as a molecular sieve can be used as the irreversible adsorbent.

The desiccants 113 and 123 included in the desiccant units 110 and 120 of the embodiment are examples of first and second desiccants, respectively. Furthermore, the cases 111 and 121 included in the desiccant units 110 and 120 of the embodiment are examples of first and second cases, respectively, and the through-hole 116 in the upper surface of the case 111 is an example of a fourth through-hole.

(Method of Manufacturing Magnetic Disk Device)

Next, a method of manufacturing the magnetic disk device 10 according to an embodiment will be described with reference to FIGS. 3A to 6. FIGS. 3A to 6 are schematic diagrams each illustrating an exemplary procedure of the method of manufacturing the magnetic disk device 10 according to the embodiment.

In a manufacturing process of the magnetic disk device 10, first, the plurality of magnetic disks 12, the spindle motor 13, the magnetic heads 14, the HSA 15, the VCM 16, the ramp load mechanism 17, and the FPC 18 are operably assembled as the magnetic disk device 10, in the base 21. In other words, the magnetic disks 12, the spindle motor 13, the magnetic heads 14, the HSA 15, the VCM 16, the ramp load mechanism 17, and the FPC 18 are operably housed in a space in the base 21.

After such necessary members are assembled in the base 21 in this manner, the inner cover 22 is mounted to the base 21.

Figure 3A:
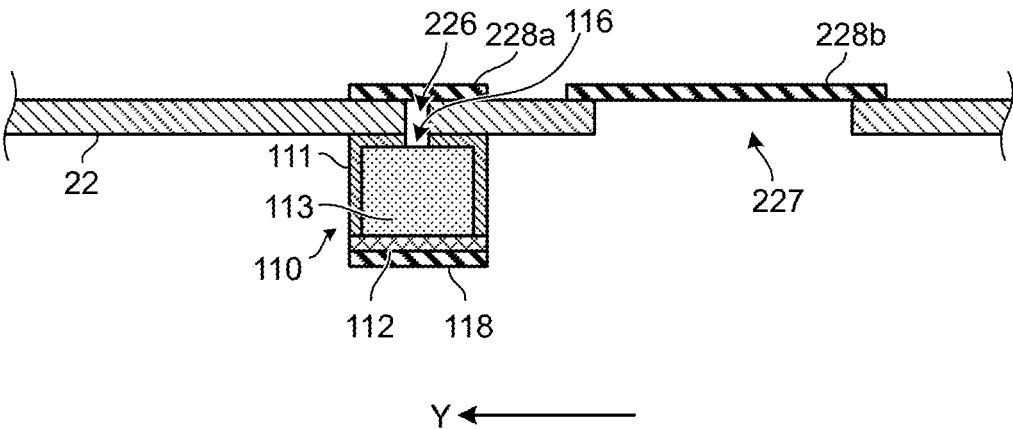
FIGS. 3A and 3B are schematic diagrams each illustrating an exemplary procedure of a method of manufacturing the magnetic disk device according to an embodiment.

As illustrated in FIG. 3A, the desiccant unit 110 is attached on the inner surface of the inner cover 22 not yet mounted to the base 21. The filter 112 on the lower surface of the desiccant unit 110 is covered with a seal 118 made of, for example, aluminum, and the through-hole 226 in the inner cover 22 to which the desiccant unit 110 is attached is covered with a seal 228a made of, for example, aluminum, from a side of an upper surface of the inner cover 22, that is, from a side of a surface opposite to the surface facing the base 21. Furthermore, the through-hole 227 in the inner cover 22 is also covered with a seal 228b made of, for example, aluminum, from the side of the upper surface of the inner cover 22.

This configuration shields the desiccant 113 in the desiccant unit 110 from the atmosphere until immediately before the inner cover 22 is mounted to the base 21, and is kept airtight in a dry state not containing at least moisture or the like.

Figure 3B:
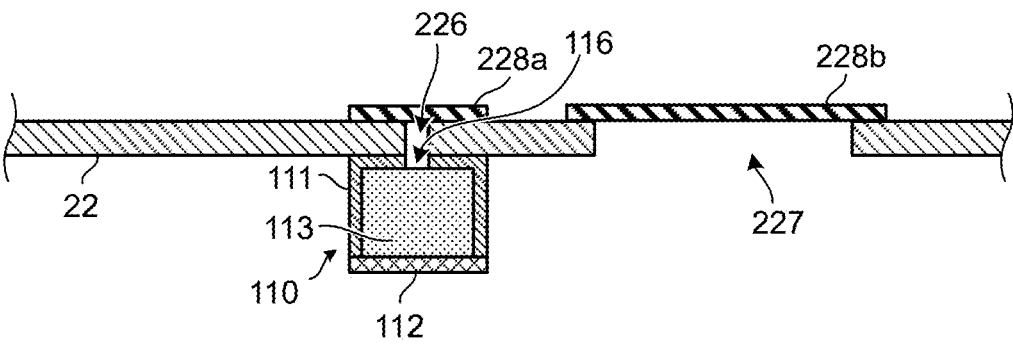
Figure 3B:
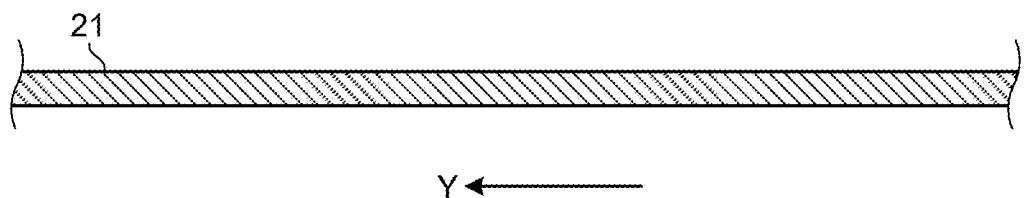

As illustrated in FIG. 3B, immediately before mounting of the inner cover 22 to the base 21, the seal 118 on the lower surface of the desiccant unit 110 is removed. Whereby the desiccant 113 filled in the desiccant unit 110 starts absorption of moisture in the environment in which the desiccant unit 110 is placed.

Figure 4A:
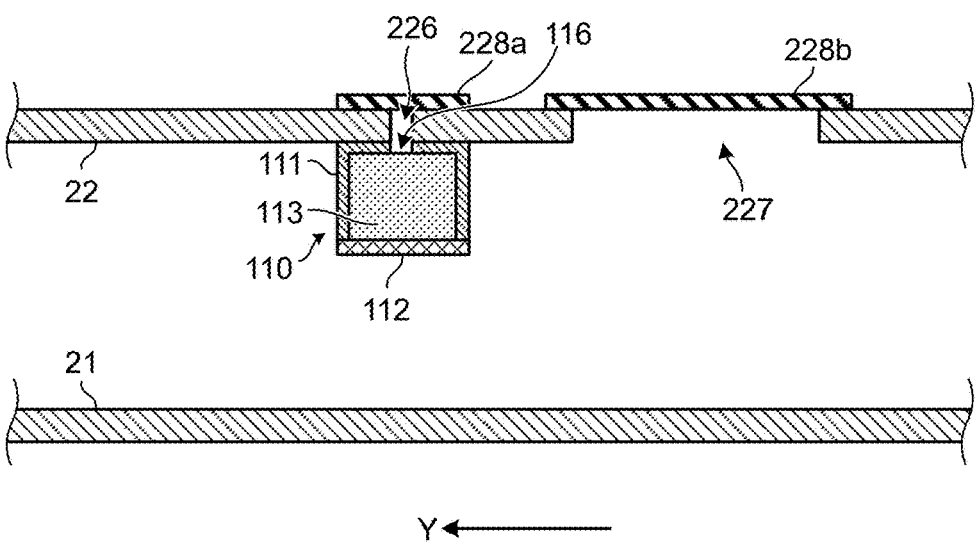
FIGS. 4A and 4B are schematic diagrams each illustrating an exemplary procedure of the method of manufacturing the magnetic disk device according to the embodiment.

As illustrated in FIG. 4A, after the seal 118 on the lower surface of the desiccant unit 110 is removed, the inner cover 22 is quickly mounted to the base 21.

In other words, the inner cover 22 and the base 21 are overlapped through, for example, the gasket or the like which is not illustrated, and the screws 224 are inserted into the insertion holes 223 of the inner cover 22 and fixed in the screw holes 213 of the base 21. Furthermore, after the screw is fastened through an insertion hole 223 provided in a recessed portion 221 near the center of the inner cover 22, the seal 225 is applied to the insertion hole 223. At this time, the PCB 19 connected to the FPC 18 is also mounted to the back surface or the like of the base 21 with these screws 224.

Furthermore, at this time, the lower surface of the case 111 is positioned above the bottom wall 211 of the base 21 without being in contact with the bottom wall 211 in a state where the inner cover 22 is mounted to the base 21, and a gap is generated between the case 111 and the bottom wall 211 of the base 21.

Whereby the desiccant 113 filled in the case 111 communicates with a space surrounded by the inner cover 22 and the base 21. Accordingly, the desiccant 113 in the case 111 is exposed via the filter 112 to the atmosphere in the internal space constituted by the inner cover 22 and the base 21.

The internal space constituted by the inner cover 22 and the base 21 is initially filled with air containing moisture and the like. Therefore, after the inner cover 22 is fastened to the base 21 with the screws, air in the inner cover 22 and the base 21 is sucked from the breather hole 222 provided in the inner cover 22. In addition, the inner cover 22 and the base 21 are filled with the gas, such as a He gas, having a density lower than that of air, from the breather hole 222.

At this time, the seal 228a covering the through-hole 226 in the inner cover 22 may be temporarily removed to suck air in the inner cover 22 and the base 21 and fill the He gas or the like into the inner cover 22 and the base 21, from the through-hole 226, in addition to the breather hole 222 described above. Alternatively, as described above, when the through-hole 226 and the breather hole 222 are the same, the atmosphere in the inner cover 22 and the base 21 can be replaced exclusively using the through-hole 226.

The discharge of air and the filling of the He gas or the like as described above are immediately performed after the inner cover 22 and the base 21 are assembled. Therefore, it is possible to reduce a time of progress of adsorption of moisture in the air started by the desiccant 113 after the seal 118 is removed, suppressing deterioration in moisture absorption performance of the desiccant 113.

As described above, the inner cover 22 is hermetically mounted to the base 21. After the inner cover 22 is mounted to the base 21, operation tests and the like for various members assembled in the base 21 are performed. Thereafter, the outer cover 23 is mounted to the inner cover 22 and the base 21.

Figure 4B:
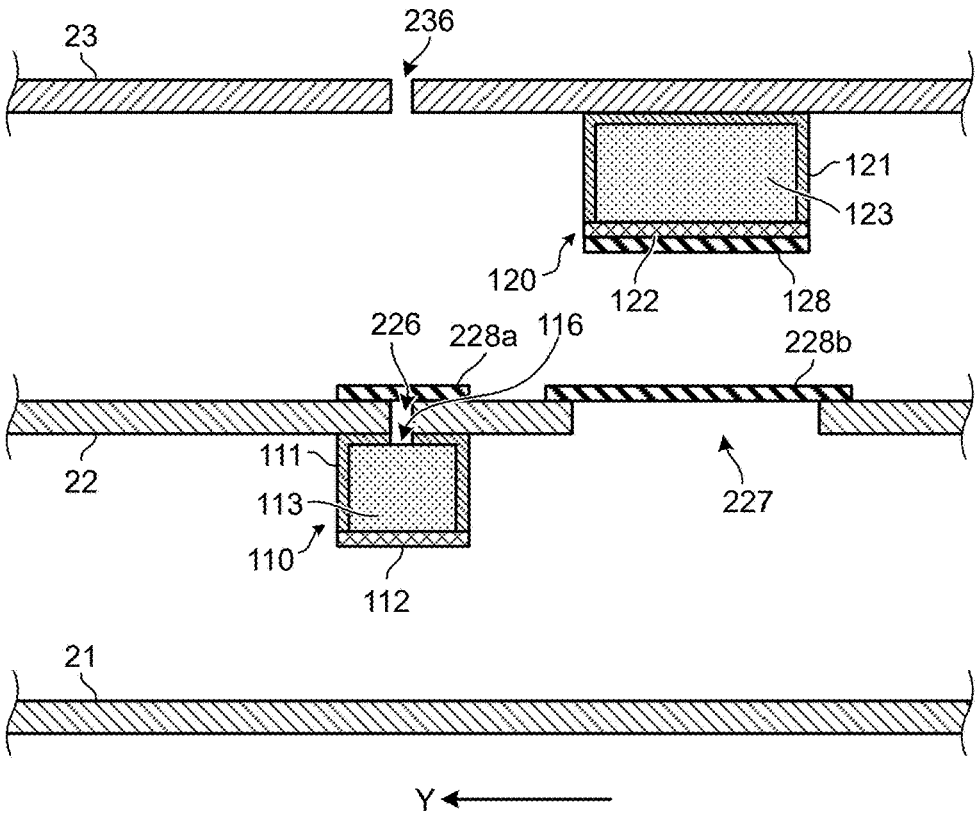

As illustrated in FIG. 4B, the desiccant unit 120 is attached on the inner surface of the outer cover 23 not yet mounted to the base 21 and the inner cover 22. Furthermore the filter 122 on a lower surface of the desiccant unit 120 is covered with a seal 128 made of, for example, aluminum.

This configuration blocks the desiccant 123 in the desiccant unit 120 from the atmosphere until immediately before the outer cover 23 is mounted to the base 21 and the inner cover 22, and is kept airtight in a dry state not containing at least moisture or the like.

Figure 5A:
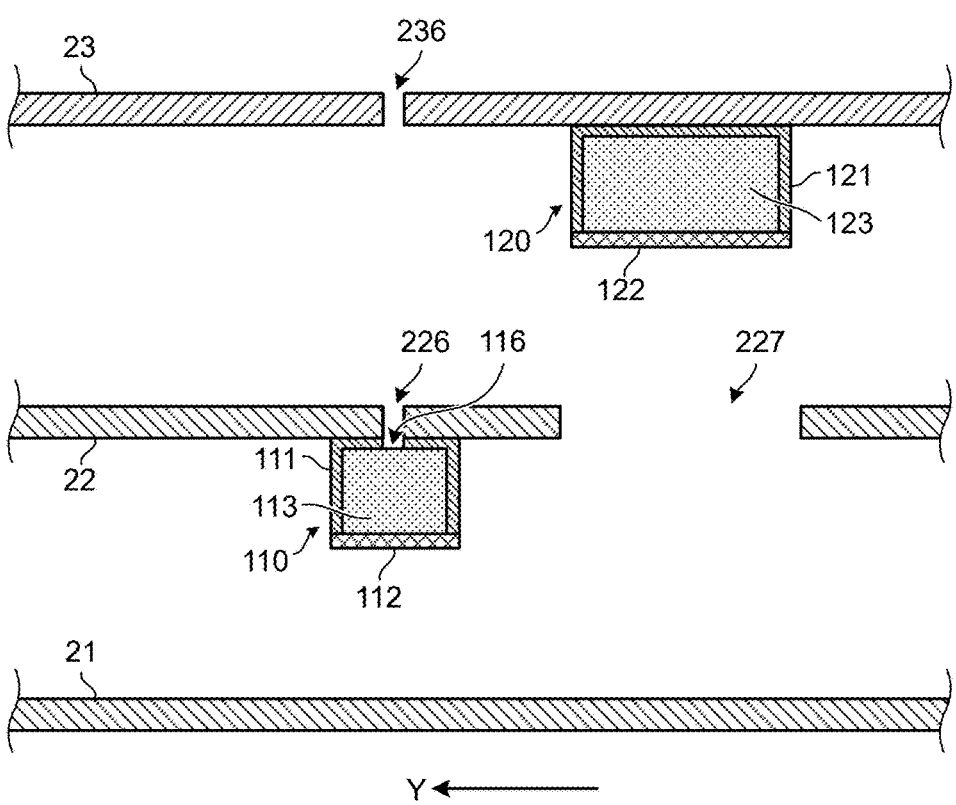
FIGS. 5A and 5B are schematic diagrams each illustrating an exemplary procedure of the method of manufacturing the magnetic disk device according to the embodiment.

As illustrated in FIG. 5A, immediately before mounting of the outer cover 23 to the base 21 and the inner cover 22, the seal 128 on the lower surface of the desiccant unit 120 is removed. Whereby the desiccant 123 filled in the desiccant unit 120 starts absorption of moisture in the environment in which the desiccant unit 120 is placed.

Furthermore, the seals 228a and 228b that close the through-holes 226 and 227, respectively, are removed from the upper surface of the inner cover 22. Whereby the internal space between the inner cover 22 and the base 21 communicate with outside air again through the through-holes 226 and 227, and the desiccant 113 of the desiccant unit 110 is exposed to the atmosphere through the through-hole 226.

Figure 5B:
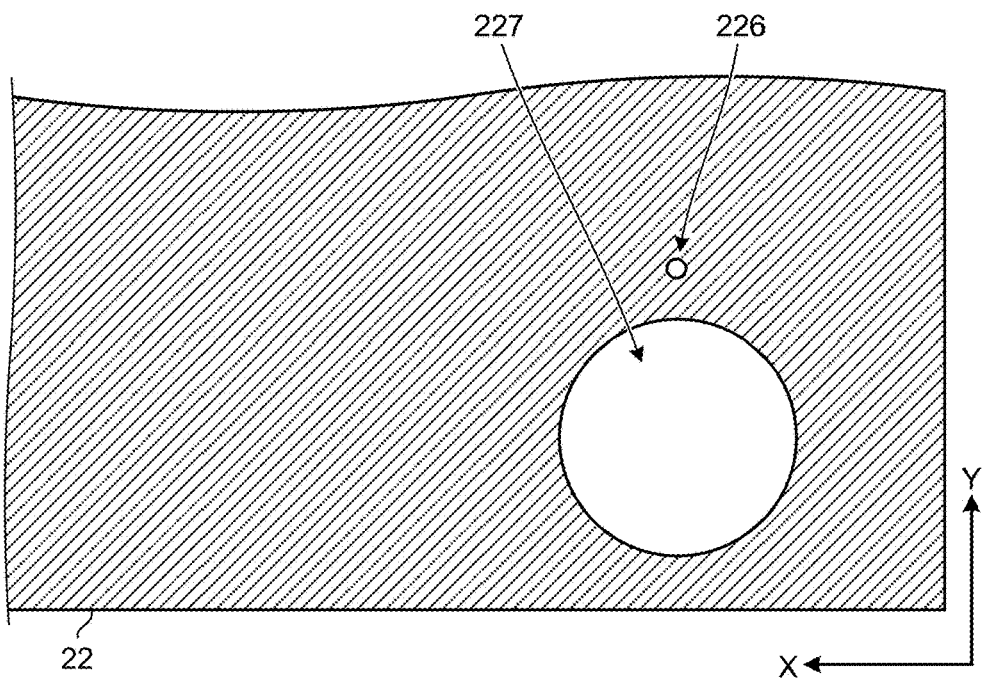

FIG. 5B is a top view of the inner cover 22 with the seals 228a and 228b removed.

As illustrated in FIGS. 5A and 5B, removing the seals 228a and 228b opens the through-hole 226 in the inner cover 22 again at the position where the through-hole 226 is vertically aligned with the through-hole 236 in the outer cover 23. In addition, the through-hole 227 in the inner cover 22 is opened again at a position where the through-hole 227 vertically overlaps the desiccant unit 120 attached on the inner surface of the outer cover 23.

Here, the through-hole 227 in the inner cover 22 has an opening area that is formed larger than a cross-sectional area of the desiccant unit 120 taken in the direction along the plane of the outer cover 23. This configuration makes it possible to insert the desiccant unit 120 attached to the outer cover 23 into the housing 20 through the through-hole 227 in the inner cover 22.

Figure 6:
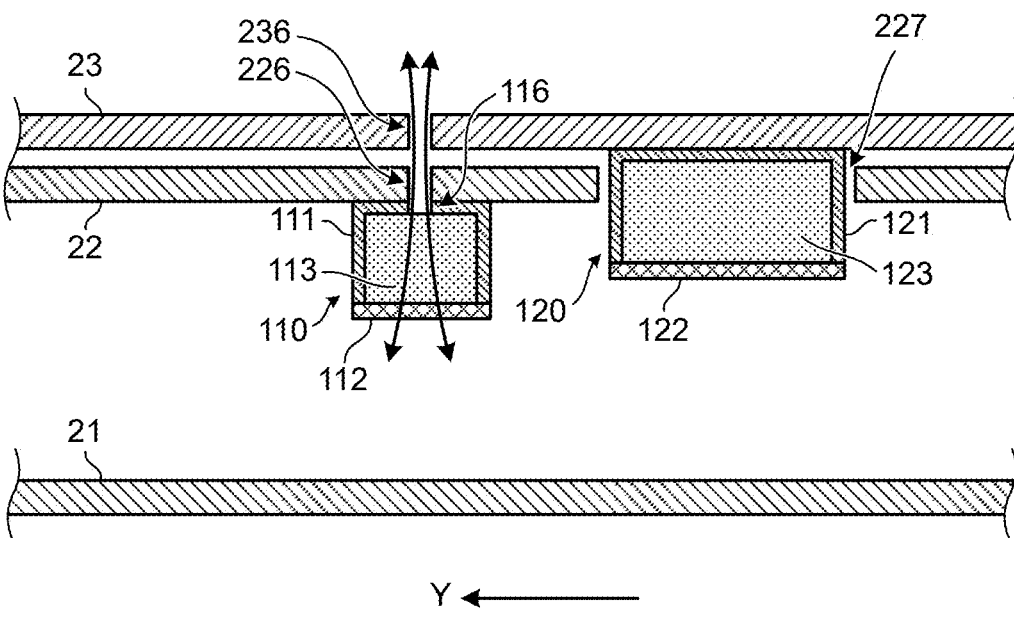
FIG. 6 is a schematic diagram illustrating an exemplary procedure of the method of manufacturing the magnetic disk device according to the embodiment.

As illustrated in FIG. 6, after the seals 228*a*, 228*b*, and 128 are removed, the outer cover 23 is overlaid on the inner cover 22, and the outer cover 23 is welded to the end of the side wall 212 of the base 21.

Furthermore, after the outer cover 23 is welded to the base 21, air in the housing 20 is sucked from the through-hole 236 formed in the outer cover 23 and the through-hole 226 formed in the inner cover 22. In addition, the housing 20 is filled with the He gas or the like from these through-holes 236 and 226. At this time, the He gas or the like flows into the housing 20, from the through-hole 116 in the upper surface of the case 111 through the desiccant 113 in the case 111 and the filter 112. Therefore, the He gas or the like from which dust or the like has been removed and cleaned can be filled in the housing 20 in a more dried state.

Thereafter, the seal 232 is applied to the upper surface of the outer cover 23 to hermetically cover the through-hole 236. In this way, the through-holes 226 and 236 in the inner cover 22 are allowed to be opened a plurality of times, from assembling the outer cover 23 to the inner cover 22 and the base 21 until immediately before finally hermetical sealing of the housing 20. Therefore, as described above, these through-holes 226 and 236 formed as small as possible makes it difficult for the outside air to flow into the housing 20 during the manufacturing process of the magnetic disk device 10, and makes it easy to maintain the inside of the housing 20 in a dry state.

As described above, the magnetic disk device 10 of the embodiment is manufactured.

Note that when at least one of the desiccants 113 and 123 in the desiccant units 110 and 120 is the reversible adsorbent or the like, a process of recovering the hygroscopicity of the desiccant 113 or 123 may be performed at predetermined timing after the outer cover 23 is mounted to the inner cover 22 and the base 21. In order to recover the hygroscopicity of the desiccant 113 or 123, heat-drying or the like can be performed in vacuum.

Here, in the desiccant 113 of the desiccant unit 110, a time from removal of the seal 118 and the like to finally hermetically sealing the housing 20 by mounting the outer cover 23 is longer than a time after removal of the seal 128 from the desiccant 123 of the desiccant unit 120. Therefore, as described above, for example, the desiccant 113 of the desiccant unit 110 is more preferably used as the reversible adsorbent so that the hygroscopicity of the desiccant 113 can be recovered.

In addition, for the desiccant 123 of the desiccant unit 120 from which the seal 128 is removed immediately before the outer cover 23 is mounted, the irreversible adsorbent having excellent hygroscopicity even in a low-humidity environment is used, although it is difficult to recover the lowered hygroscopicity, as described above, making it possible to more precisely control the humidity in the housing 20 after the housing is finally hermetically sealed.

CONCLUSION

In recent years, in a large-capacity magnetic disk device, a gas-sealed HDD in which a He gas or the like is sealed in a housing has become mainstream. In the He-sealed HDD, in order to enhance the reliability of the magnetic disk device, controlling humidity inside the housing is an important issue. A heat-assisted magnetic recording (HAMR) HDD for information writing with heat assistance is significantly influenced by humidity.

Therefore, in the He-sealed HDD, for example, a desiccant is sealed to control the humidity in the housing. In an assembly process of the magnetic disk device, if a time during which the desiccant is exposed to air is prolonged, there is a concern that the desiccant is sealed with the moisture absorption performance deteriorated or the desiccant is saturated before the housing is sealed.

The magnetic disk device 10 according to an embodiment includes the desiccant unit 110 that is provided at the inner cover 22 to face the base at a position away from the base 21, and the desiccant unit 120 that is provided at the outer cover 23 and inserted into the internal space of the housing 20 through the through-hole 227 provided in the inner cover 22 to face the base at a position away from the base 21.

Therefore, moisture absorption by the desiccant units 110 and 120 is started at different timings, that is, the timing at which the inner cover 22 is assembled to the base 21 and the timing at which the outer cover 23 is assembled. Therefore, as a whole, it is possible to suppress the saturation of the desiccants 113 and 123 and make these desiccants 113 and 123 function for a longer period of time.

According to the magnetic disk device 10 of an embodiment, the inner cover 22 has the through-hole 226 at a position where the through-hole 226 vertically overlaps the desiccant unit 110. The outer cover 23 has the through-hole 236 at the position where the through-hole 236 is vertically aligned with the through-hole 226 in the inner cover 22. Furthermore, the desiccant unit 110 includes the case 111 filled with the desiccant 113 and provided with the through-hole 116 at a position where the through-hole 116 is vertically aligned with the through-hole 226 in the inner cover 22.

This configuration makes it possible to replace the atmosphere in the housing 20 again after the inner cover 22 and the outer cover 23 are assembled to the base 21. Therefore, the atmosphere in the housing 20 can be made cleaner to reduce humidity.

According to the magnetic disk device 10 of an embodiment, the seal 232 that covers the through-hole 236 from a side of a surface opposite to a surface facing the inner cover 22 is applied to the outer cover 23. This configuration makes it possible to maintain airtightness in the housing 20.

According to the magnetic disk device 10 of an embodiment, the opening area of the through-hole 226 in the inner cover 22 is smaller than the cross-sectional area of the desiccant unit 110 taken in the direction along the plane of the inner cover 22. In this way, the through-hole 226 in the inner cover 22 formed sufficiently small makes it possible to suppress an increase in humidity in the housing 20 due to inflow of outside air into the housing 20 through the through-hole 226 in the manufacturing process of the magnetic disk device 10.

According to the magnetic disk device 10 of an embodiment, the desiccant 113 is the reversible adsorbent capable of recovering the hygroscopicity by drying, or the irreversible adsorbent having hygroscopicity even when the irreversible adsorbent is in a lower-humidity environment than the reversible adsorbent, and the desiccant 123 is the irreversible adsorbent. In this way, using the irreversible adsorbent having high moisture absorption performance for at least one of the desiccants 113 and 123 makes it possible to more precisely control the humidity in the housing 20.

According to the magnetic disk device 10 of an embodiment, the desiccant 113 is the reversible adsorbent capable of recovering the hygroscopicity by drying, and the desiccant 123 is the irreversible adsorbent having hygroscopicity even when the irreversible adsorbent is in a lower-humidity environment than the reversible adsorbent.

In this way, the reversible adsorbent is used for the desiccant 113 whose moisture absorption start timing is early in the manufacturing process of the magnetic disk device 10, making it possible to restore the hygroscopicity of the desiccant 113 once again at the final stage of the manufacturing process. In addition, using the irreversible adsorbent for the desiccant 123 whose moisture absorption start timing is late in the manufacturing process of the magnetic disk device 10 makes it possible to suppress the saturation itself of the desiccant 123, though having hygroscopicity difficult to recover, and to maintain the humidity in the housing 20 lower for a longer period of time by the desiccant 123 having high moisture absorption performance.

MODIFICATION

Next, a desiccant assembly 100a according to a modification of the embodiment will be described with reference to FIGS. 7 to 8B. The desiccant assembly 100a of the modification is different from that of the embodiment described above in that a gasket 233 is provided.

Figure 7:
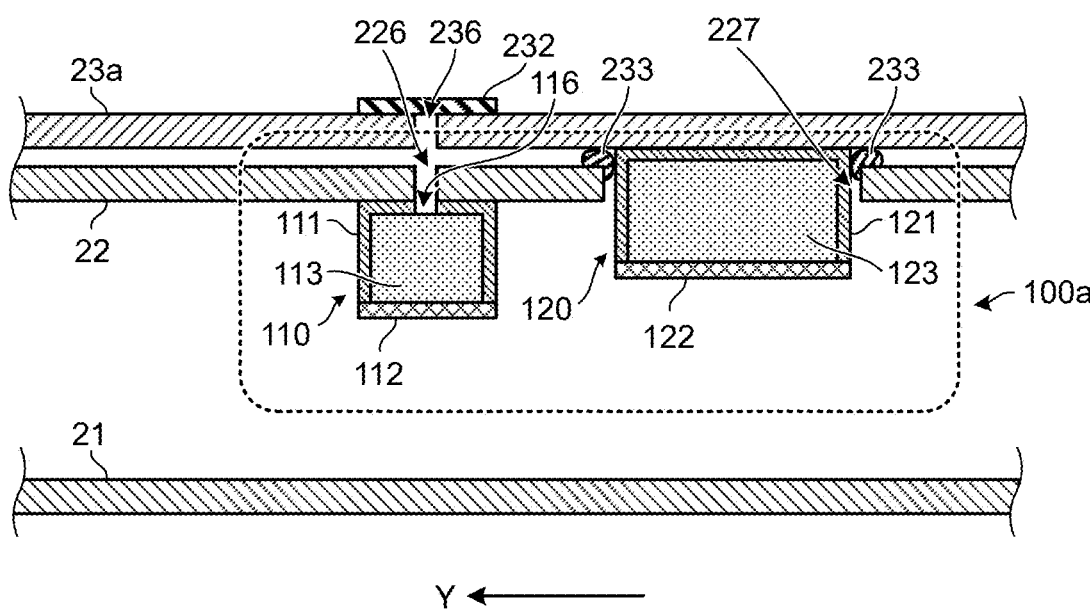
FIG. 7 is a cross-sectional view of a desiccant assembly according to a modification of the embodiment, taken in a Y-direction.

FIG. 7 is a cross-sectional view of the desiccant assembly 100a according to a modification of the embodiment, taken in the Y-direction. Note that in the following drawings, the same reference numerals are given to the same configurations as those of the embodiment described above, and the descriptions thereof may be omitted.

As illustrated in FIG. 7, the desiccant assembly 100a of the modification includes the respective configurations of the desiccant assembly 100 of the embodiment described above, and an outer cover 23a includes the gasket 233 around the desiccant unit 120.

The gasket 233 is provided at a portion of the desiccant unit 120 that is attached to the outer cover 23a so as to surround the desiccant unit 120. As described in the method of manufacturing the magnetic disk device 10 of the embodiment described above, the inner cover 22 is mounted to the base 21 via, for example, the gasket or the like. As the gasket 233 of the desiccant assembly 100a of the modification, for example, a gasket made of resin can be used, similarly to the above-described gasket interposed between the inner cover 22 and the base 21.

However, the material of the gasket 233 is not limited to resin, and the gasket 233 may be made of, for example, metal or the like having sufficient flexibility.

As described above, in order to insert the desiccant unit 120 attached to the outer cover 23a into the internal space of the housing 20, the inner cover 22 is provided with the through-hole 227. In the desiccant assembly 100a of the modification, the gasket 233 provided around the desiccant unit 120 seals a gap in the through-hole 227 generated between the desiccant unit 120 and the inner cover 22.

This configuration shields a space between the outer cover 23a and the inner cover 22 from the internal space of the housing 20 surrounded by the inner cover 22 and the base 21, and even if, for example, a gas or the like is generated in the space between the outer cover 23a and the inner cover 22, the gas or the like is suppressed from directly flowing into the internal space of the housing 20 through the gap in the through-hole 227 of the inner cover 22 formed around the desiccant unit 120.

The space between the outer cover 23a and the inner cover 22 communicates with the internal space of the housing 20 also through the through-hole 226 in the inner cover 22, but the gas or the like flowing into the housing 20 from the through-hole 226 reaches the inside of the housing 20 through the desiccant unit 110, and therefore, moisture or the like in the gas can be removed in advance.

Figure 8A:
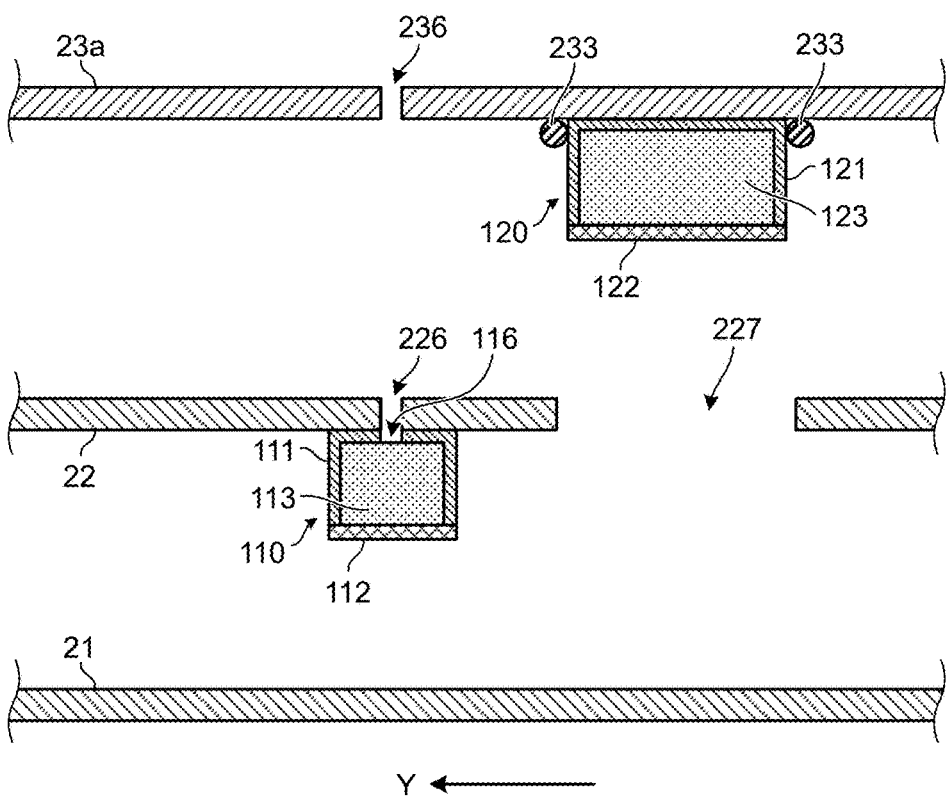
FIGS. 8A and 8B are schematic diagrams each illustrating an exemplary procedure of a method of manufacturing the magnetic disk device according to the modification of the embodiment.
Figure 8B:
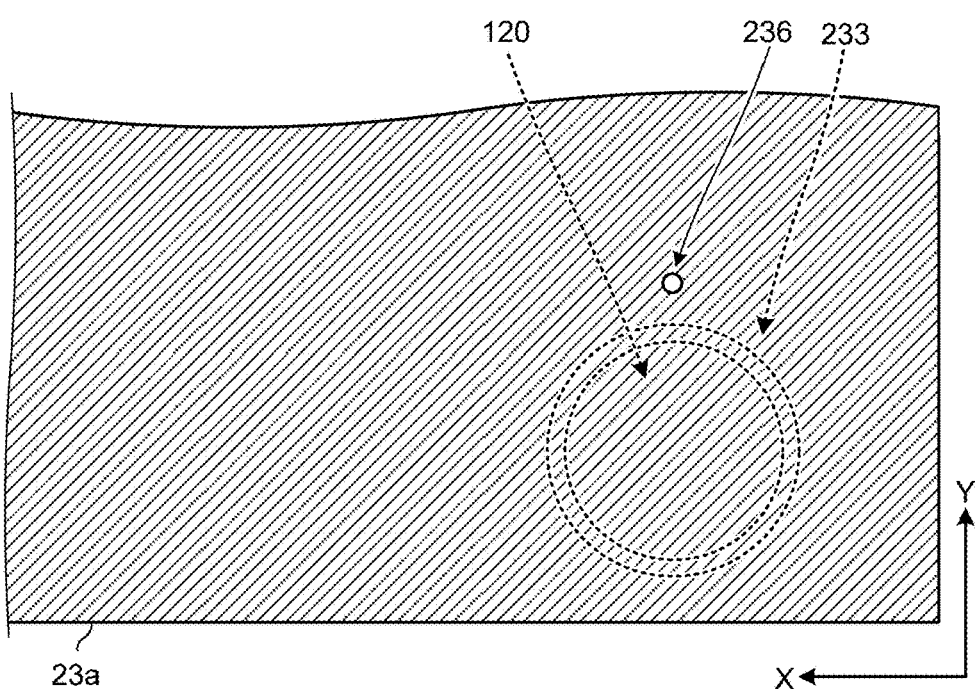

FIGS. 8A and 8B are schematic diagrams each illustrating an exemplary procedure of a method of manufacturing the magnetic disk device according to the modification of the embodiment. More specifically, FIGS. 8A and 8B illustrate process steps corresponding to process steps of FIGS. 5A and 5B of the embodiment described above.

As illustrated in FIG. 8A, the seals 128 on the lower surface of the desiccant unit 120 and the seals 228a and 228b that close the through-holes 226 and 227 in the upper surface of the inner cover 22 are removed immediately before mounting to the base 21 and the inner cover 22.

Furthermore, the outer cover 23a of the modification is further provided with the gasket 233, around the desiccant unit 120 attached on an inner surface of the outer cover 23a.

As illustrated in FIG. 8B, when the cross-section of the desiccant unit 120 taken along the outer cover 23a has a circular shape or the like, the gasket 233 has an annular shape along the circular shape of the desiccant unit 120.

When the outer cover 23a having such a configuration is overlaid on the inner cover 22 and the outer cover 23a and inner cover 22 are welded to the base 21, the desiccant unit 120 on the inner surface of the outer cover 23a is inserted into a position facing the base 21 inside the housing 20 through the through-hole 227 in the inner cover 22. At this time, the gasket 233 around the desiccant unit 120 pressed against the edge of the through-hole 227 in the inner cover 22 is crushed, and fills the gap in the through-hole 227 generated between the desiccant unit 120 and the inner cover 22.

According to the magnetic disk device of the modification, the gasket 233 that seals the gap in the through-hole 227 of the inner cover 22 generated between the desiccant unit 120 and the inner cover 22 is interposed around the desiccant unit 120. This configuration suppresses direct communication of the space between the inner cover 22 and the outer cover 23a with the internal space of the housing 20 surrounded by the inner cover 22 and the base 21. Therefore, the humidity in the internal space of the housing 20 can be controlled more precisely, and the inflow of dust or the like into the internal space of the housing 20 can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device further comprising:
a housing in which a base, an inner cover provided with a first through-hole, and an outer cover are combined in this order and hermetically sealed;
a magnetic disk that is stored in the housing;
a first desiccant unit that is provided at the inner cover to face the base at a position away from the base;
a second desiccant unit that is provided at the outer cover and inserted into an internal space of the housing through the first through-hole provided in the inner cover to face the base at a position away from the base; and a gasket interposed around the second desiccant unit, the gasket sealing a gap in the first through-hole generated between the second desiccant unit and the inner cover.

2. The magnetic disk device according to claim 1, wherein the inner cover includes a second through-hole at a position where the second through-hole vertically overlaps with the first desiccant unit, the outer cover includes a third through-hole at a position where the third through-hole is vertically aligned with the second through-hole, the first desiccant unit includes a first case filled with a first desiccant and provided with a fourth through-hole at a position where the fourth through-hole is vertically aligned with the second through-hole, and a seal covers the third through-hole from a side of a surface opposite to a surface facing the inner cover and is applied to the outer cover.

3. The magnetic disk device according to claim 2, wherein an opening area of the second through-hole is smaller than a cross-sectional area of the first desiccant unit taken in a direction along a plane of the inner cover.

4. The magnetic disk device according to claim 1, wherein the first desiccant unit includes a first case filled with a first desiccant, the second desiccant unit includes a second case filled with a second desiccant, and the first and second desiccants are each an irreversible adsorbent having hygroscopicity even in a lower-humidity environment than a humidity environment in which a reversible adsorbent capable of recovering hygroscopicity by drying is capable of exhibiting hygroscopicity.

5. The magnetic disk device according to claim 1, wherein the first desiccant unit includes a first case filled with a first desiccant, the second desiccant unit includes a second case filled with a second desiccant, the first desiccant is a reversible adsorbent capable of recovering hygroscopicity by drying, or an irreversible adsorbent having hygroscopicity even in a lower-humidity environment than a humidity environment in which the reversible adsorbent is capable of exhibiting hygroscopicity, and the second desiccant is an irreversible adsorbent.

6. The magnetic disk device according to claim 1, wherein the first desiccant unit includes a first case filled with a first desiccant, the second desiccant unit includes a second case filled with a second desiccant, the first desiccant is a reversible adsorbent capable of recovering hygroscopicity by drying, and the second desiccant is an irreversible adsorbent having hygroscopicity even in a lower-humidity environment than a humidity environment in which the reversible adsorbent is capable of exhibiting hygroscopicity.

7. A magnetic disk device comprising:

a housing in which a base, an inner cover provided with a first through-hole, and an outer cover are combined in this order and hermetically sealed;

a magnetic disk that is stored in the housing;

a first desiccant unit that is provided at the inner cover to face the base at a position away from the base; and a second desiccant unit that is provided at the outer cover and inserted into an internal space of the housing through the first through-hole provided in the inner cover to face the base at a position away from the base, wherein the first desiccant unit includes a first case filled with a first desiccant, the second desiccant unit includes a second case filled with a second desiccant, and the first and second desiccants are each an irreversible adsorbent having hygroscopicity even in a lower-humidity environment than a humidity environment in which a reversible adsorbent capable of recovering hygroscopicity by drying is capable of exhibiting hygroscopicity.

8. The magnetic disk device according to claim 7, wherein the inner cover includes a second through-hole at a position where the second through-hole vertically overlaps with the first desiccant unit, the outer cover includes a third through-hole at a position where the third through-hole is vertically aligned with the second through-hole, the first case filled with the first desiccant is provided with a fourth through-hole at a position where the fourth through-hole is vertically aligned with the second through-hole, and a seal covers the third through-hole from a side of a surface opposite to a surface facing the inner cover and is applied to the outer cover.

9. The magnetic disk device according to claim 8, wherein an opening area of the second through-hole is smaller than a cross-sectional area of the first desiccant unit taken in a direction along a plane of the inner cover.

10. The magnetic disk device according to claim 7, further comprising:

a gasket interposed around the second desiccant unit, the gasket sealing a gap in the first through-hole generated between the second desiccant unit and the inner cover.

* * * * *